(12) United States Patent
Puglia

(10) Patent No.: US 7,791,530 B2
(45) Date of Patent: Sep. 7, 2010

(54) TIME DUPLEX APPARATUS AND METHOD FOR RADAR SENSOR FRONT-ENDS

(75) Inventor: Kenneth V. Puglia, Westford, MA (US)

(73) Assignee: Autoliv ASP, Inc., Ogden, UT (US)

( * ) Notice: Subject to any disclaimer, the term of this patent is extended or adjusted under 35 U.S.C. 154(b) by 8 days.

(21) Appl. No.: 11/327,739

(22) Filed: Jan. 5, 2006

(65) Prior Publication Data

US 2007/0152871 A1  Jul. 5, 2007

(51) Int. Cl.
*G01S 13/26* (2006.01)
*G01S 13/34* (2006.01)
(52) U.S. Cl. ...................... 342/128; 342/132
(58) Field of Classification Search ................ 342/200
See application file for complete search history.

(56) References Cited

U.S. PATENT DOCUMENTS

| | | | | |
|---|---|---|---|---|
| 3,087,153 | A * | 4/1963 | Richards | 342/94 |
| 3,370,166 | A * | 2/1968 | Da Rold et al. | 246/182 BH |
| 3,991,418 | A | 11/1976 | Bennett | |
| 4,161,732 | A * | 7/1979 | Longuemare, Jr. | 342/201 |
| 4,219,812 | A * | 8/1980 | Rittenbach | 342/110 |
| 4,952,939 | A * | 8/1990 | Seed | 342/27 |
| 5,309,160 | A * | 5/1994 | Powell et al. | 342/128 |
| 5,636,123 | A * | 6/1997 | Rich et al. | 701/207 |
| 5,726,657 | A * | 3/1998 | Pergande et al. | 342/202 |
| 5,910,785 | A * | 6/1999 | Normant | 342/25 A |
| 6,020,843 | A * | 2/2000 | Krikorian et al. | 342/25 D |
| 6,337,656 | B1 | 1/2002 | Natsume et al. | |
| 2007/0152871 | A1* | 7/2007 | Puglia | 342/70 |

FOREIGN PATENT DOCUMENTS

| | | |
|---|---|---|
| EP | 0 916 968 A2 | 5/1999 |
| WO | WO 03/044560 A1 | 5/2003 |

OTHER PUBLICATIONS

Chan et al., "A Beam Scanning Frequency Modulated Continuous Wave Radar," IEEE Transactions on Instrumentation and Measurement, IEEE Service Center, Piscataway, NJ, U.S., vol. 47, No. 5, Oct. 1, 1998, pp. 1223-1227.

(Continued)

*Primary Examiner*—Thomas G Black
*Assistant Examiner*—Shelley Chen
(74) *Attorney, Agent, or Firm*—Sally J Brown; Brinks Hofen Gilson & Lione

(57) ABSTRACT

A radar system and method for determining the range and, optionally, the azimuth of a target, while maintaining a high transmitting duty factor is provided. A waveform generator is connected to an antenna aperture by a transmit-receive switch, and the waveform is transmitted for more than half of the period of time of the sum of the transmission period and the receiving period. For a frequency-modulated continuous-wave waveform (FMCW), the receiver may be turned on for short intervals at a rate which is at least the Nyquist rate for the signal received from at target. A monopulse or frequency-scanned antenna may be used to determine azimuth as well as range.

19 Claims, 11 Drawing Sheets

OTHER PUBLICATIONS

Khan et al., "Waveform analysis for high-frequency FMICW radar," IEE Proceedings, F. Communications, Radar & Signal Processing, Institution of Electrical Engineers, Stevenage, GB, vol. 138, No. 5, Oct. 1, 1991, pp. 411-419.

McGregor et al., "Switching system for single antenna operation of an S-band FMCW radar," IEE Proceedings: Radar, Sonar & Navigation, Institution of Electrical Engineers, GB, vol. 141, No. 4, Aug. 1, 1994, pp. 241-248.

International Search Report for International Application No. PCT/US2006/048942, dated May 15, 2008, 4 pages.

* cited by examiner

TIME DUPLEX APPARATUS AND METHOD FOR RADAR SENSOR FRONT-ENDS

TECHNICAL FIELD

The present application relates to radar systems, and more particularly to substantially continuous wave radar systems.

BACKGROUND

The principle of radar is well known. There exist a variety of configurations of transmitters, receivers, antennas, transmitted waveforms and signal processing techniques, which have been adapted to provide for systems for detection of an aircraft, vehicle, or object, weather or other natural phenomenon, and the like. Each of the configurations may take into account such factors as the range to the target, target size and speed of motion, response time, and the desired resolution in range, speed and direction.

FIG. 1 illustrates a frequency-modulated continuous-wave (FMCW) radar 1 having a transmitting antenna 2, a receiving antenna 3, and a power divider 4, or other circuit to provide a sample of the transmitted signal to a mixer 5. A waveform generator 6 provides the transmitted signal waveform. The transmitted signal is reflected from a target 9. The reflected signal is received by the receiving antenna 3 and mixed with the sample of the transmitted signal in the mixer 5. A difference frequency between the generated waveform and the reflected signal is formed by the mixer 5 and amplified and filtered in the remainder of the receiver 7. A receiver may include a mixer 5, and filters and amplifiers 8 to select and amplify an appropriate mixer output. A signal processor 10 extracts a desired radar response associated with a target.

FIG. 2 illustrates the relative relationship of a transmitted signal 11, and a received signal 12, as a function of time during a linear FMCW transmitted signal period. The linear FMCW transmission is repeated periodically, and, except for the period of time associated with the transition from the upper frequency to the lower starting frequency of the transmitted waveform, a difference frequency between the transmitted waveform and the received waveform is given by:

$$\Delta f = K\Delta t + f_d \quad (1)$$

The time rate of change of frequency or ramp rate, K, may be a positive or negative quantity. The duration of a ramp, $T_{Ramp}$, and the ramp rate K, determine the time-bandwidth product of the FMCW signal. The range resolution of the radar is approximately $1/(T_{Ramp}K)$, which is the inverse of the transmitted bandwidth of the entire ramp, and $f_d$ is the target Doppler shift frequency. Sequences of ramps may have the same ramp rate, K, and duration, $T_{Ramp}$, or sequences may have values of K and $T_{Ramp}$ which are different from ramp to ramp, depending on the type of signal processing employed and the particular information that is to be extracted from the received signal.

The receiver 7 may be of the homodyne or superheterodyne type, as is known in the art, with a signal output spectrum having a frequency content given by (1), with the receiver signal output as an input to the signal processor 10. Frequency components associated with the transition between the upper and lower frequency limits of the ramp at the end of a ramp period are usually substantially greater that the maximum difference frequency expected for the radar design, and are eliminated by filtering in the receiver 7 or signal processor 10.

The signal output of the receiver 7 is processed by a signal processor 10 to derive the required output data. In a situation where the target and the radar are stationary with respect to each other, the output of the receiver 7 is a frequency whose value is a function of the distance to the target and the radar parameters in accordance with the first term on the right hand side of (1). The signal processor may include a spectrum analyzer, frequency counter, a computer executing a Fast Fourier Transform (FFT) or the like. When there is relative motion between the radar and the target, a Doppler frequency shift in accordance with the second term on the right hand side of (1), and depending on the magnitude of the Doppler shift and its relevance to the use of the radar, a number of means of separating the Doppler shift from the range-dependent frequency component are known in the art.

One use of radar is in automotive applications relating to safety or operator alerting, such as determining the distance to obstacles or other vehicles, or the closing speed, and the direction of the closing object. It is desirable to perform these functions with a minimum of expense, and in a manner compatible with the installation constraints associated with vehicular applications. The FMCW waveform has been used in this application, in configurations which use two antennas: a transmitting antenna and a receiving antenna. Use of two antennas increases the isolation between the transmitted waveform and the received waveform to avoid such problems as receiver overload, transmitted noise desensitization, or the like. In another configuration, a single antenna has been used for transmitting and receiving, with the isolation between the transmitting signal and the received receiver input being obtained by the use of a circulator. However, in some circumstances, the isolation of the transmitted signal from the receiver input may be inadequate, the dynamic range of the receiver may not be sufficient to prevent overload by signal returns from nearby objects, or the transmitted background noise coupled through the circulator may exceed the desired signal amplitude.

An improved means of providing a radar for automotive and other uses is desired.

SUMMARY

A radar is disclosed, including a waveform generator, a transmit-receive switch and a mixer, and the transmit-receive switch is in a transmit state for greater than half of a sum of a duration of the transmit state and a receive state.

In another aspect, a method of detecting targets is disclosed, including the steps of: generating a radio frequency waveform; providing the radio waveform to an antenna for a first period; receiving a signal from the antenna during a second period; and, processing the received signal to determine a target range, where a ratio of the first period to the second period is greater than unity.

DETAILED DESCRIPTION

Figure 1:
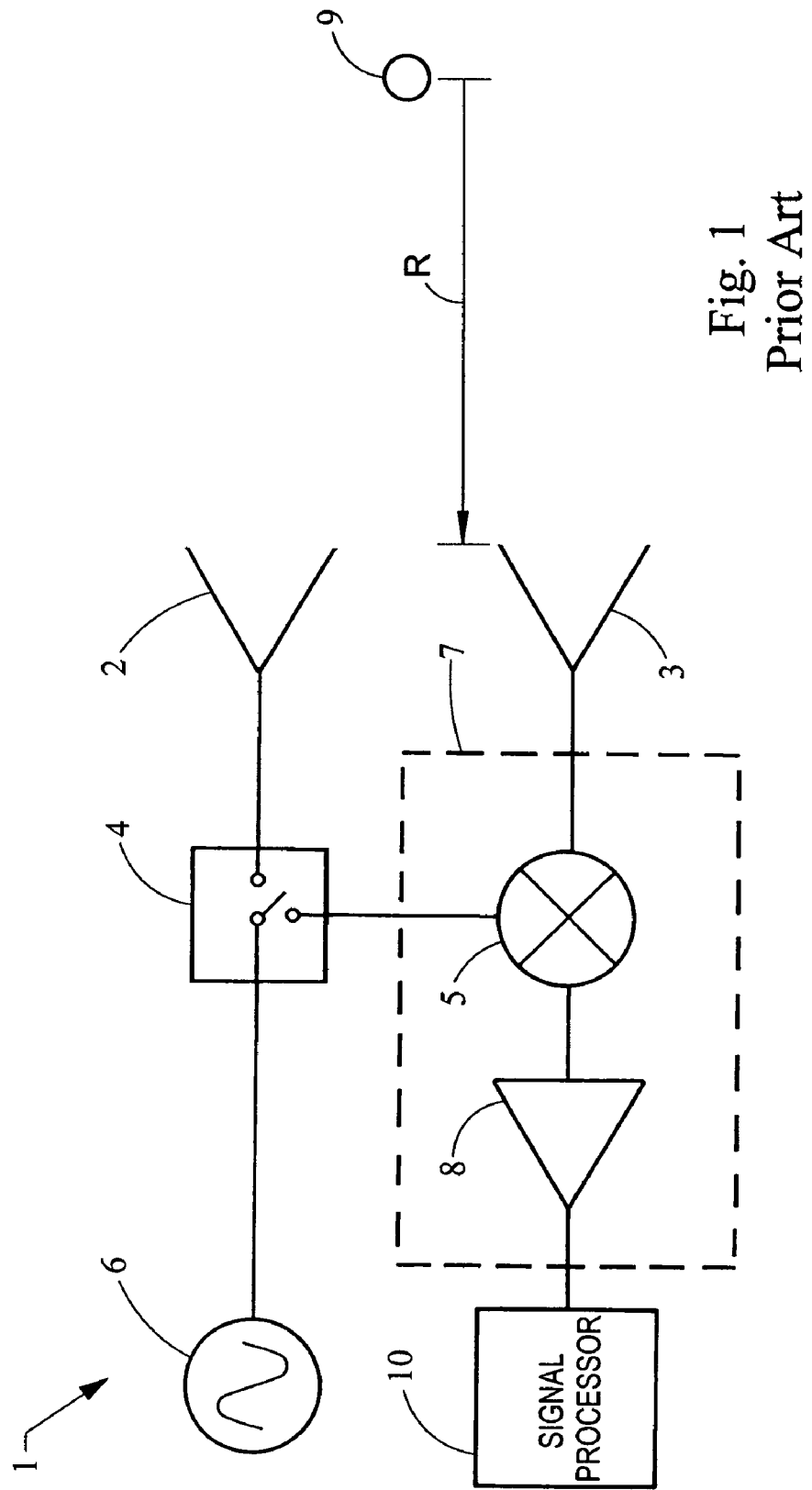
FIG. 1 is a block diagram of a conventional radar.
Figure 2:
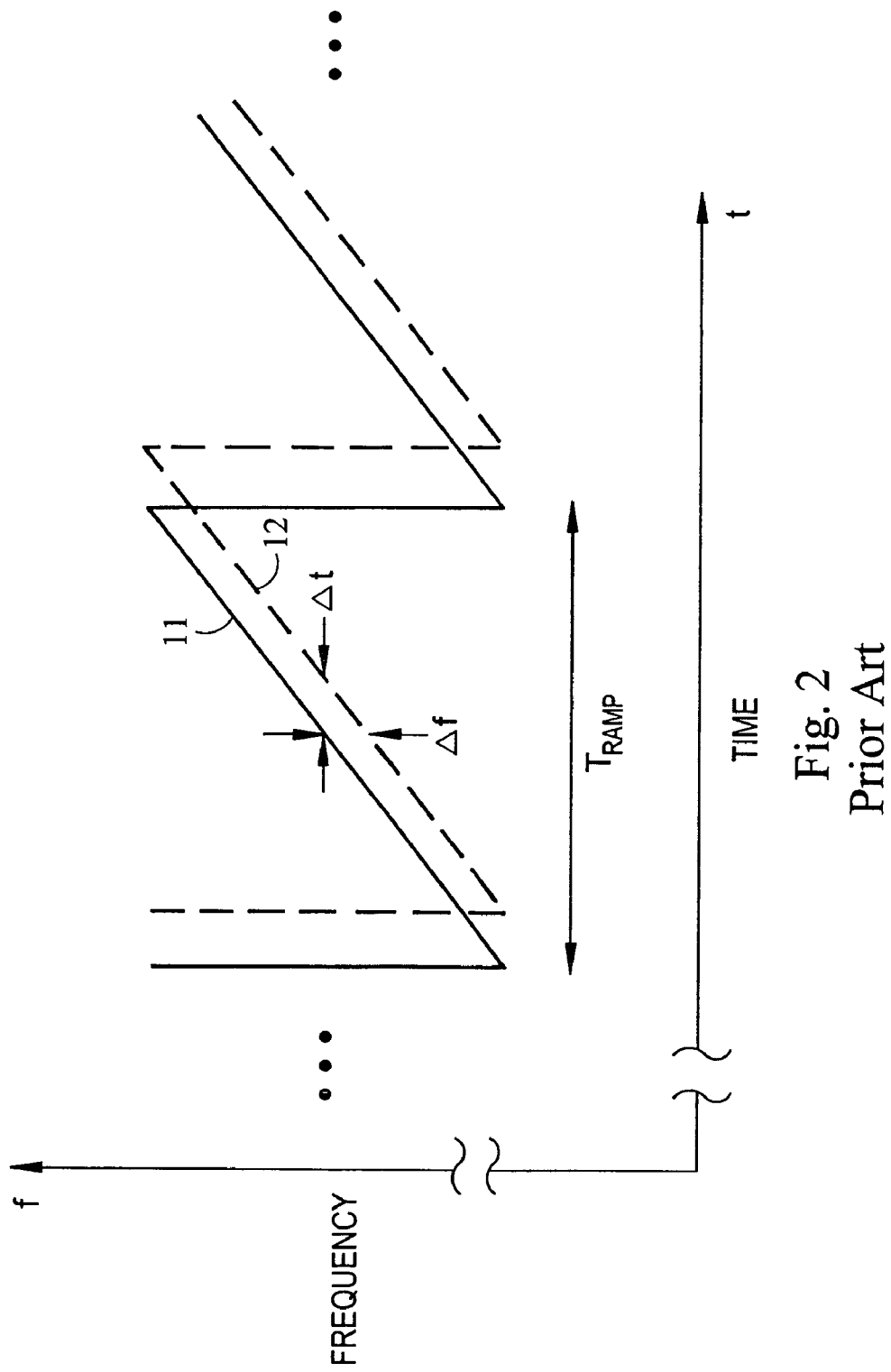
FIG. 2 is a graph of the time-frequency characteristics of a ramp of a FMCW radar and the relationship to a target return signal.

Exemplary embodiments of the invention may be better understood with reference to the drawings, but these embodiments are not intended to be of a limiting nature. Rather, the invention is to cover all modifications, equivalents, and alternatives falling within the spirit and scope of the invention which is set forth by the claims.

A radar configuration is disclosed wherein a substantially continuous waveform is transmitted and received by an antenna aperture, and samples of the received signal obtained by gating the transmitter off, while gating the receiver on. A variety of waveform types may be used, such as frequency-modulated continuous-wave (FMCW), frequency shift keying (FSK), pseudo-noise phase code (PN), random frequency hopping (RFH) and the like. In an aspect, the period of time associated with the transmitted transmitting the signal may be greater than or equal to the time that the receiver is enabled for receiving the returned signal.

In another aspect, the transmitter and the receiver are connected to a common antenna aperture through a transfer switch, such that the transmission of the generated signal is interrupted for a period of time and the generated signal waveform is also used as a local oscillator input to the receiver mixer to demodulate the received signal during a time when the signal is not being transmitted. Alternatively, the transmitter and receiver may be connected to separate antennas or connected together through a circulator, so that an antenna transfer switch may not be used. In another aspect, a transfer switch may be used to connect the generated waveform to the antenna during a transmit period and to the receiver mixer during a receive period.

When a FMCW waveform is used, the received signal differs from the transmitted signal by a frequency which is a function of the range to the reflecting target and the radial velocity of the target, in accordance with equation (1). After processing in the receiver, an output signal is obtained which represents a difference frequency between the generated waveform and the received signal waveform.

The samples of the received signal obtained during the period when the transmitter is turned off, and the receiver is configured to receive a signal, may be processed to determine the value of the difference frequency. Where the sequence of alternating transmitting and receiving periods is regular within a FMCW waveform, the sampling is periodic, and the time sequence of receiver output values may be considered to be data samples of the received signal. The sampling frequency is given by the inverse of the time duration of the sum of a single transmitting and receiving period duration occurring within a FMCW ramp. That is, a data sample may be obtained at least once per receive period. The duration of each sample may be less than the duration of the receive time and may be related to the aperture time of the analog-to-digital converter (ADC). Typically, the process of down-conversion of a received signal from the transmitted frequency to a frequency that is used for signal processing in the receiver may involve some filtering of the signal, further modifying the time duration characteristics. The sample may also be considered as a measure of the instantaneous phase of the received signal.

A sampling frequency satisfying the Nyquist criterion, that is, a sampling frequency is greater than or equal to twice the maximum expected difference frequency at the output of the receiver as given by, for example, equation (1), results in a time sequence of samples of the received signal spectrum, which may be processed to determine such characteristics as the range to the target, the target radial velocity with respect to the radar and other parameters. When a suitable antenna is used, the azimuthal direction to the target may also be obtained. The word "target" is generically used to represent any object that reflects or scatters radio waves, and a signal returned from the target is the signal processed by the receiving apparatus of the radar. A target may be an automobile, a wall, an aircraft, a meteorological effect, or the like, depending on the physical situation.

When a FSK waveform is used, the sample of received signal is obtained at least once during the time period during which the transmitted signal is present on each of at least two frequencies. Random frequency hopping (RFH) waveforms may be considered as a FSK waveform with multiple frequencies and where the repetition period on any frequency is long.

When a pseudo-random or pseudo-noise (PN) modulation signal is used, the sample of the received signal is obtained at least once during the time period of each chip, where a "chip" is the time during which the phase of the transmitted signal is constant.

In an aspect, an antenna aperture may be provided for which the radiation pattern half-power beamwidth is narrow compared with the total azimuth over which the radar is intended to operate. The antenna aperture is configured so that an azimuth of maximum antenna gain is a function of the signal wavelength, so that the azimuth of the maximum antenna gain varies during a single FMCW transmission, or from frequency to frequency in the case of a random frequency hop (RFH) waveform.

In another aspect, the transmitting and receiving antennas may be different, or be parts of a shared aperture, and multiple transmit and receive antenna beams may be formed simultaneously or sequentially.

In yet another aspect, a circulator may be used to provide isolation between the transmitter and the receiver components, either alone or in combination with signal path switches.

The means of generating the FMCW, FSK or RFH waveforms may be one of a phase-locked loop, a direct digital synthesizer (DDS), a dispersive filter, or the like.

The processing of a received signal may be by either analog or digital circuits, or a combination thereof. The signal processing may be also performed by one or more computers with associated memory and computer code and configured to perform mathematical operations and functions equivalent to that performed by the analog or digital circuits. Herein, there is not intended to be a restriction of the type of circuit which performs each function, or the combination of types of circuits which may be used, although the examples may mention a specific type of circuit in the description thereof.

In an aspect where a computer or a digital circuit is used, the received signal may be converted from analog format to a digital representation thereof in an analog-to-digital converter (ADC), as is known in the art. The conversion process may be performed at any point after reception by the antenna. The choice of location of the ADC will depend on the specific application.

Figure 3:
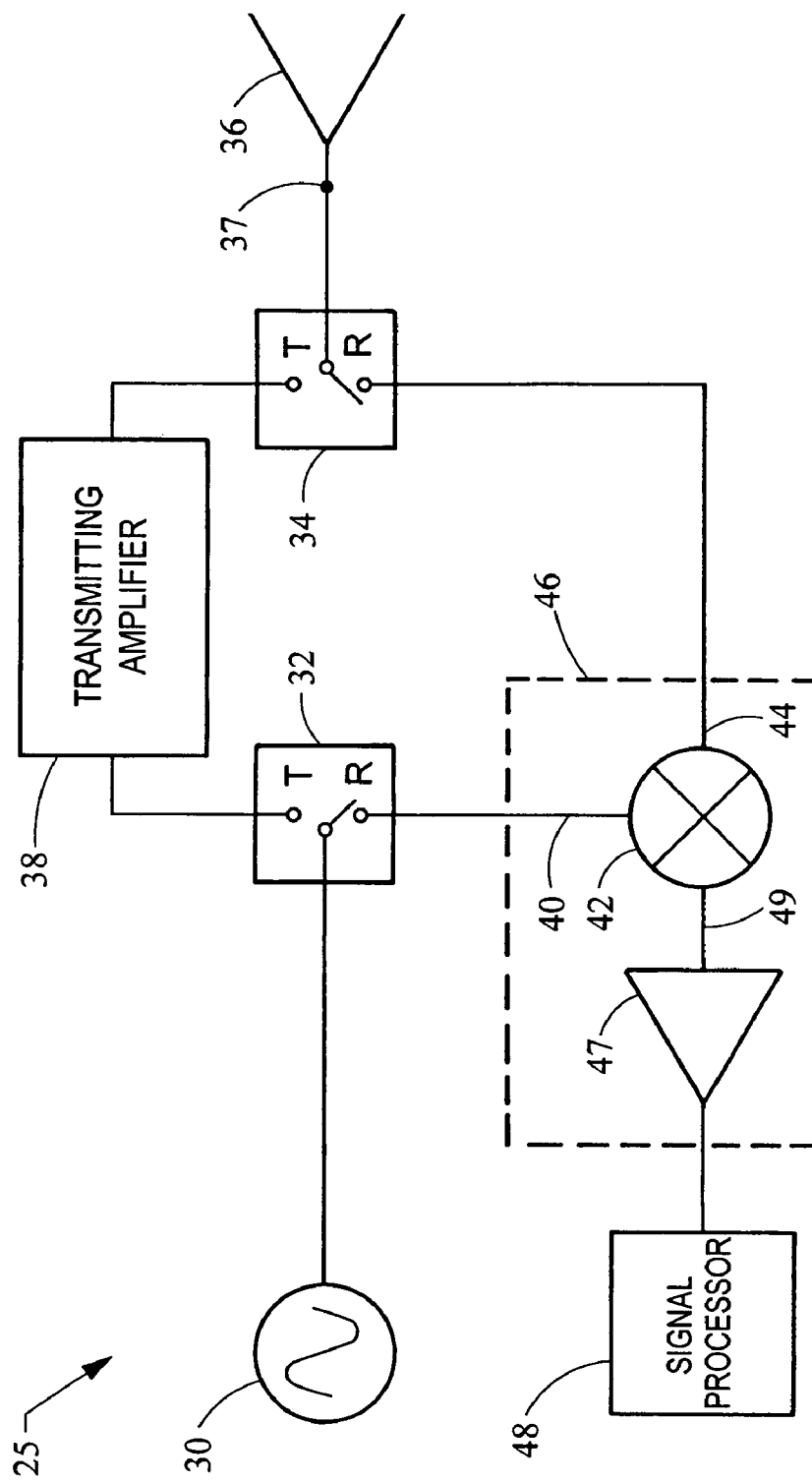
FIG. 3 is a block diagram of a radar having a single antenna aperture.

In an example, shown in FIG. 3, a radar 25 may include a waveform generator 30 generating a continuous or substantially continuous waveform, which may be a FMCW, FSK, or RFH waveform; a receiver 46 having a mixer 42 and amplifiers and filters 47; and a signal processor 48. When the transmitting amplifier 38 is connected to an antenna 36, and energy is being transmitted, the receiver 46 is disabled or disconnected, so that the transmitted energy is not received and receiver overload or desensitization may be avoided. When energy is not being transmitted, the receiver 46 and signal processor 48 may be active and receive signals present at the output 37 of the antenna 36. The antenna feed point 37 is the output of the antenna 36 for receiving purposes and may be used as the input of the antenna 36 for transmitting purposes. The receiver may be disabled by, for example, interrupting the connection between the receiver 46 and the antenna 36 by a switch 34, by interrupting the connection between the waveform generator 30 and a mixer input by a switch 32, or both, or by a similarly acting circuit.

Although a radar 25 may have a transmitting amplifier 38 which acts to amplify the waveform provided by the waveform generator 30, the transmitting amplifier 38 is not explicitly shown in the remaining figures, as the function of the transmitting amplifier 38 is well known in the art.

In an aspect, a first transfer switch 32 connects the output of the waveform generator 30 to either a first input 40 of a mixer 42 or to a connection to one of two input terminals of a second transfer switch 34, which may be through a transmitting amplifier 33 as shown in FIG. 3. The output of the second transfer switch 34 is applied to the antenna 36, providing the signal to be transmitted. A second input terminal of the second transfer switch 34 is connected to a second input 44 of the mixer 42. The output 49 of the mixer 42 is connected to the receiver amplifiers and filters 47, and the output of the receiver 46 is connected to a signal processor 48.

This description of a radar is intentionally simplified for purposes of clarity and omits such typical elements as the details of the receiver and the timing and synchronization circuits, and similar circuits as these functions as are typical in radar equipment as is known in the art.

When the first transfer switch 32 and second transfer switch 34 are in the position designated "T", the output of the waveform generator 30 is connected to the antenna 36 and the waveform is radiated into space by the antenna 36. To receive a signal, the first transfer switch 32 and the second transfer switch are in the position designated "R". In this state, antenna 36 is connected to the second input 44 of the mixer 42, and the waveform generator 30 is connected to the first input 40 of the mixer 42 of the receiver 46. The state of the transfer switches 32, 34 are periodically changed from "T" to "R", such that, for a period of time, both switches are in either the "T" state or the "R" state. For a substantial portion of the time, the transfer switches 32, 34 are in the "T" state.

In detail, the sequence of state transitions may not be simultaneous, so as to prevent receiver overload or to limit the duration of signal reception so that the mixer may operate as a sampling phase detector. However, in the descriptions, a simultaneous and instantaneous transition of the two switches between a transmit state and a receive state is sufficient to describe the examples. Further, more than one samples S of the received signal may be obtained during the "R" state.

FIG. 4 illustrates the transmitted FMCW waveform 50 and the received signal 52 associated with the transmitted waveform 50 having been reflected from a target (not shown) at a distance D from the radar antenna location. For simplicity, a single received signal 52 is shown, although multiple received signals may be present when there are multiple targets at differing distances from the radar. Where multiple signals are present, the output of the receiver 46 may be considered to have a frequency spectrum containing information resulting from multiple target returns, each frequency in the output spectrum representing the energy returned by one or more targets associated with a range resolved interval. The distance represented by a range resolved interval depends on the effective signal bandwidth. It should be understood that, in the case of a FMCW waveform, the Doppler shift of a target having a radial velocity with respect to the radar is added to the frequency difference between the target return signal and the generated waveform resulting from the round-trip time delay to the target as represented in equation (1). Where separation of the range and Doppler shift components is desired, processing techniques as are known in the art are used.

Figure 4A:
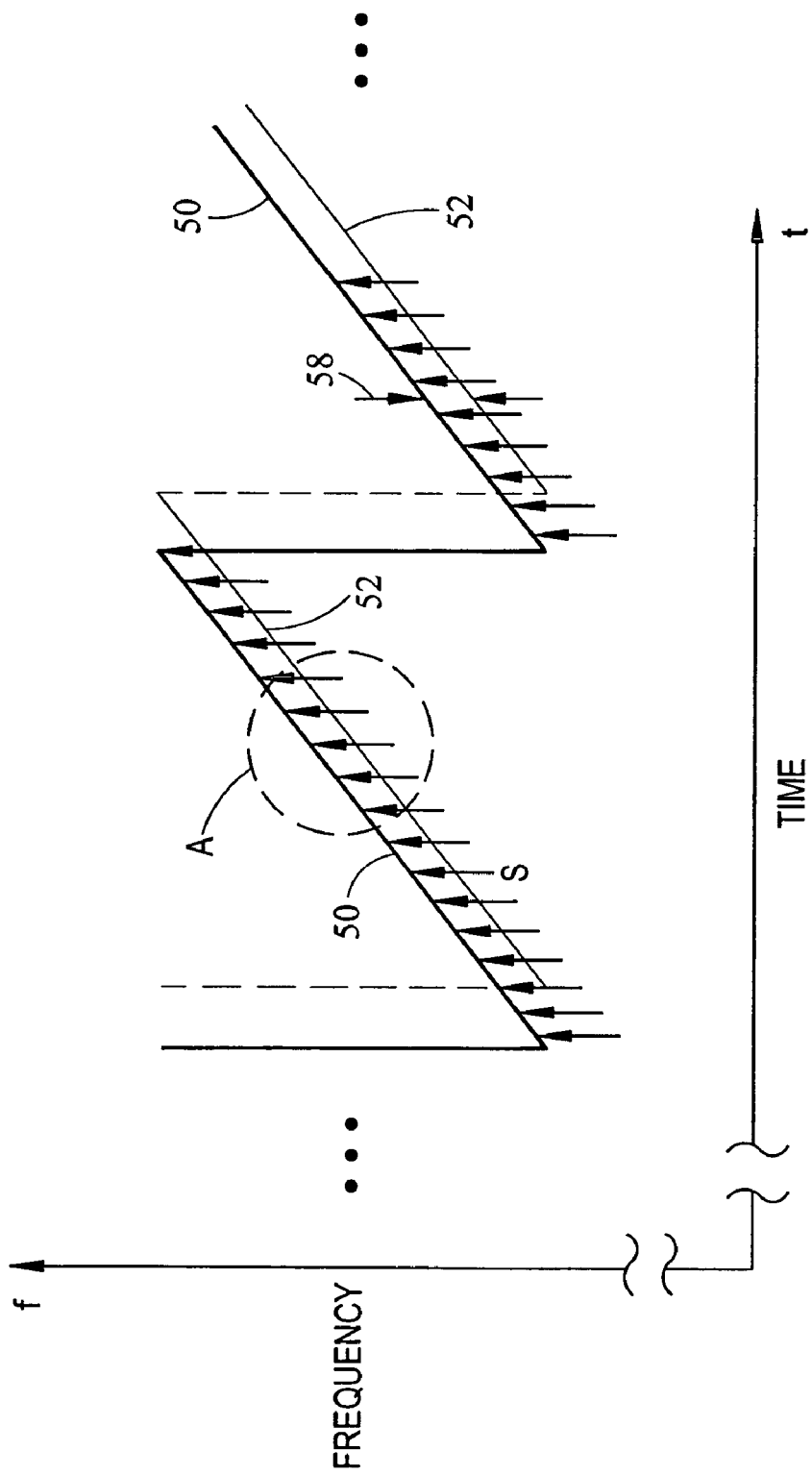
FIG. 4A is a time-frequency graph showing sampling of a received FMCW waveform at periodic intervals.

At a time when the transfer switches 32 and 34 are in the "R" state, a sample of the received signal is obtained, and this operation is illustrated in FIG. 4A by vertical lines S headed by an arrow. The time intervals between samples are periodic, at a frequency satisfying the Nyquist criteria, as is known in signal processing. The Nyquist frequency is twice the maximum frequency for which an unambiguous analysis of a frequency spectrum is desired. The maximum desired frequency is the difference frequency 58 between the transmitted waveform 50 and the received signal 52, and may be calculated from equation (1) for the maximum design range of the radar, where the chirp rate K, the operating frequency $f_o$, and the maximum target radial velocity and range are characteristic of a specific system design.

The mixer 42 produces both sum and difference frequency products of the waveform generator 50 signal and the received signal 52, and the difference frequency between the two signals is given by equation (1). The sum frequency may be eliminated by filtering in receiver 46.

Figure 4B:
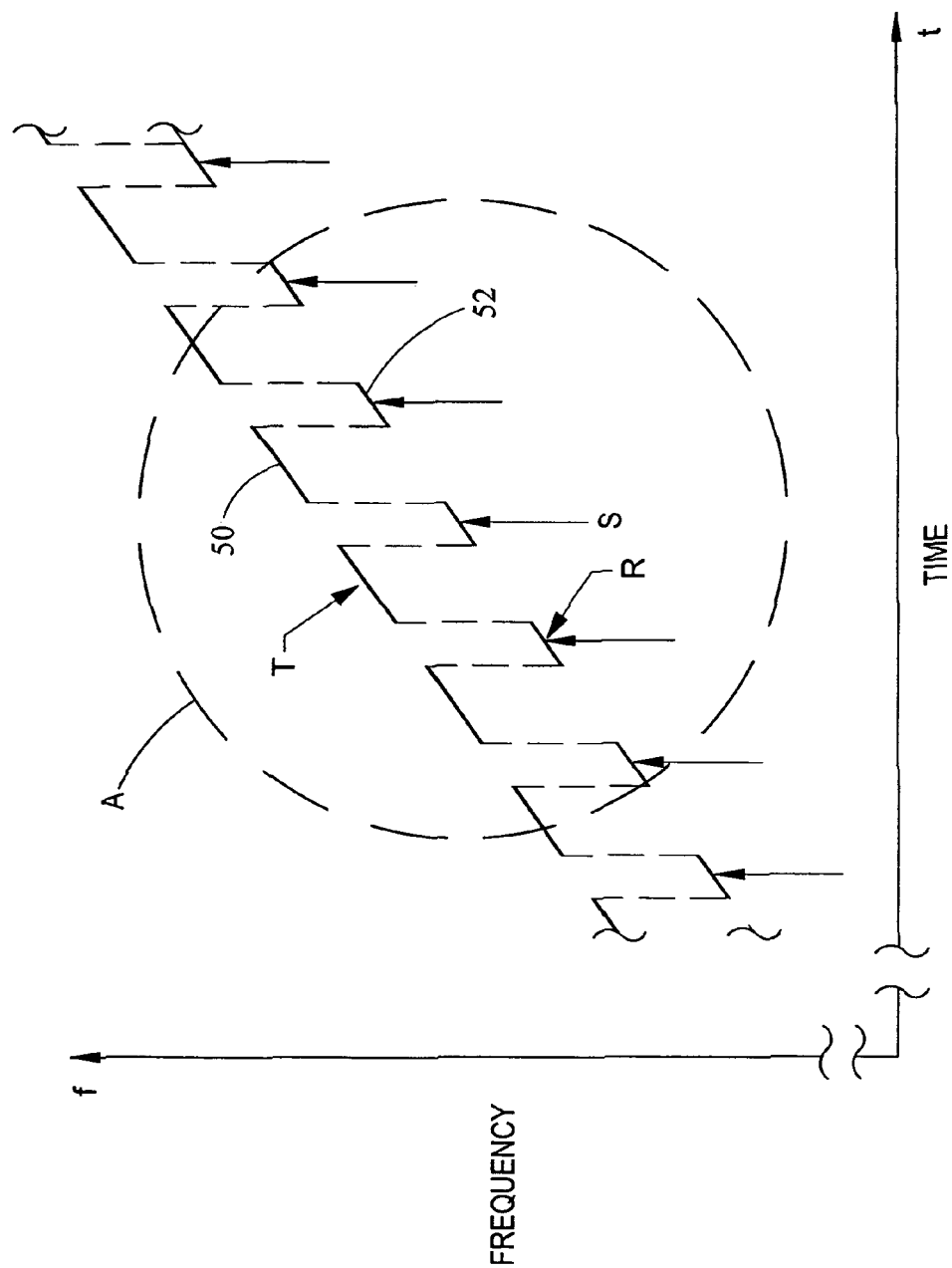
FIG. 4B is a detail of FIG. 4A showing the relationship of the transmitted waveform, the period of receiving a waveform and the periodic sampling of the received waveform.

FIG. 4B is a detail of FIG. 4A and illustrates the relationship of a transmit period "T" to the receive period "R" within a FMCW ramp. The waveform generator 30 is connected to an antenna 36 during the periods marked "T", when the transfer switches 32, 34 are in the transmit position, and the antenna 36 radiates the transmitted signal. Periodically, at the Nyquist sample rate, the transmitter is disconnected from the antenna 36 and the antenna output 37 is connected to the receiver 46, when the transfer switches 32, 34 are in the "R" position. Signals reflected from a target and received by the antenna 36 are further processed by the receiver 46 and the signal processor 48 to obtain information on the target. Within the receive interval "R" a sample of the received signal can be obtained when there is no transmitted signal, and this is illustrated by the periodic occurrence of a sample point S. This maybe a result of the action of an analog-to-digital converter (ADC) having a sample time that is short as compared to the duration of a period of the waveform to be sampled.

The duration of the "R" interval may be substantially less than the duration of the "T" interval. The generated signal may be applied to a local oscillator input port 40 of the mixer 42 during the receive interval "R" by switch 32. The period of time that the generated signal is applied to the input port may be less than or equal to the duration of a receive interval "R".

In an aspect, the period of time where the generated signal 30 is applied to the input port 40 of the mixer 42 may be shorter than the duration of the receive interval "R" such that the generated signal is represented by a sampling pulse "S" as shown in FIG. 4B. In this aspect, in accordance with the known operation of a mixer (typically, a double-balanced mixer), an output 49 of the mixer 42 is obtained only when a signal is present each of the input ports 40 and 44. In this manner, the period of time where the received signal is sampled by the sampling pulse "S" may be made short, and the mixer may act as a sampling phase detector of the signal received by the antenna 37, and applied to the input of the mixer 44 by the transmit-receive switch 34. The mixer may be considered to act as a sample-and-hold phase detector, and the analog-to-digital converter sample may be delayed with respect to the reception time.

In yet another aspect, the "R" interval and the "T" interval may be allowed to be approximately equal, where the transmit-receive switch is in a transmit state for greater than half of a sum of a duration of the transmit state and a receive state. A design trade-off may be made between switching speed of the transmit-receive switches 32, 34, cost, sensitivity and other factors. The ratio of the "R" interval and the "T" interval maybe between approximately equal in one design, and a situation where the "R" interval is very much shorter than the "T" interval in another design. The minimum duration of the "R" interval is limited only by such considerations as the transient response time of the receiving circuits and the switching time of the switches. Thus, the duty factor, defined as the "T" interval divided by sum of the "R" interval and the "T" interval, and expressed as a percentage, ranges from 50 percent to substantially 100 percent. In an automotive radar application, for example a duty factor of greater or equal to about 95 percent may be employed.

Figure 5:
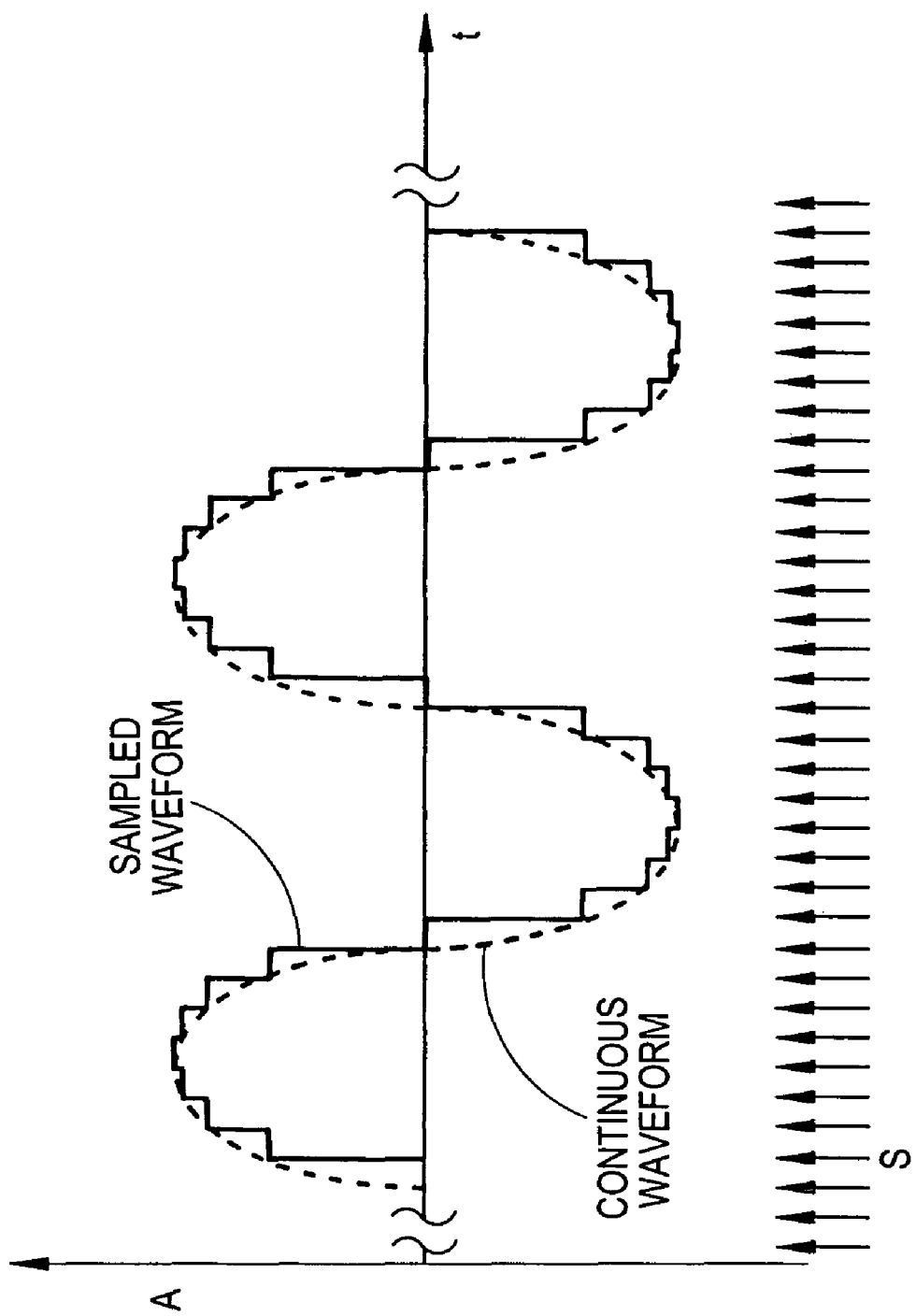
FIG. 5 shows the amplitude of a continuous waveform at the output of a receiver, and a stepwise representation of the continuous waveform obtained by sampling the continuous waveform at intervals S.

The received signal may be converted from analog to digital form by an analog-to-digital converter (ADC) at the output of the mixer 42, the receiver 46, or the input to the signal processor 48. FIG. 5 illustrates the waveform of the signal at the output of the ADC. The dashed line represents a continuous waveform of a frequency which may represent a radar return under the circumstances that the receiver could be operated continuously. The stair-step approximation to the continuous signal represents the periodic sampling of the waveform by an ADC at sample intervals S. The amplitude of the signal may be considered constant during sample interval. As is known in the art, when the sampling frequency satisfies the Nyquist criteria, the signal waveform may be unambiguously represented and analyzed.

The repetition frequency of the sample pulse S is chosen so as to satisfy the Nyquist criteria, and further signal processing may unambiguously determine the difference frequency resulting from mixing the received signal, associated with a return from a target, with the waveform produced by the waveform generator 30. It will be understood by persons skilled in the art that the relative signal strength of received radar signals depends on a number of factors, including the radar cross section of the target, the target azimuth with respect to the radar antenna radiation pattern and the range from the radar. The design maximum range to the target to avoid ambiguities due to "fold over" targets at long ranges will differ in each application, and may result in choosing a sampling frequency greater than the Nyquist frequency which would obtain if only the maximum range of interest is considered.

Operation of the radar 25 with a single antenna aperture may reduce the physical area needed to install the radar, and as will be described later, suitable antennas may permit the determination of the target azimuth as well as the target range. Alternatively, more than one antenna may be used for either transmitting or receiving.

Figure 6:
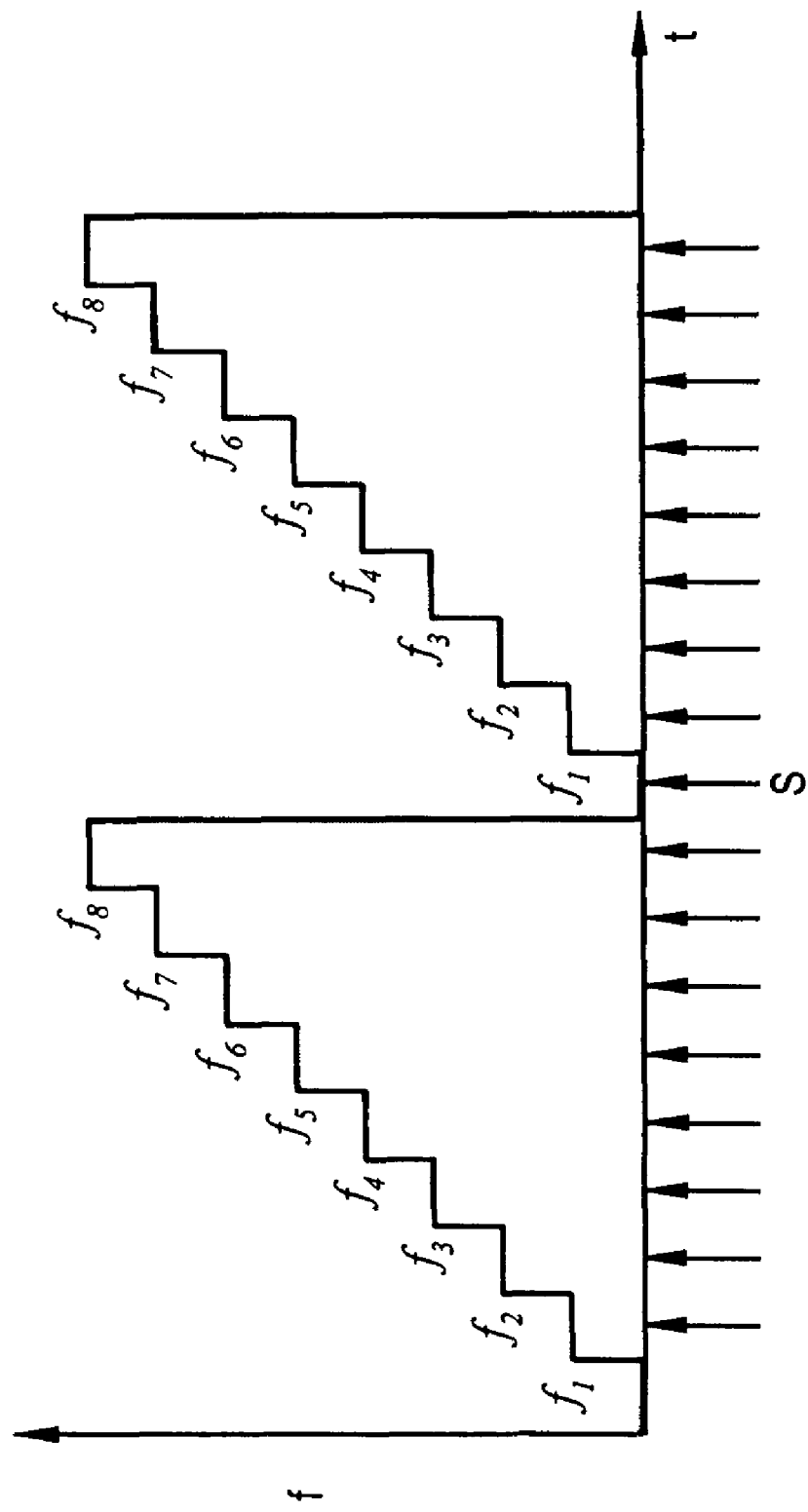
FIG. 6 shows a time-frequency graph of a stepped FMCW waveform with samples taken at intervals S.

In another aspect, the FMCW waveform may be represented by a stepped-frequency waveform as shown in FIG. 6. The average rate of change of frequency is a ramp rate, K, and the samples S may be at a sample rate having the same rate as the rate at which the discrete frequency steps are made.

In yet another aspect, where the angular direction between a radar antenna reference baseline direction and the target is also desired, the azimuth of the target may be determined by a number of means, associated with specific antenna configurations, is are known in the art. They include frequency and time delay scanning array antennas, pedestal mounted dish antennas, monopulse and sequential-lobing antennas, phased arrays and the like. The variation of the signal response of the antenna as a function of azimuth, in both transmitting and receiving configurations, is known as the free-space radiation pattern. Except for a multiplicative factor associated with antenna efficiency, the form of an antenna radiation pattern for transmitting and receiving is identical, and the discussion therefore may only describe one or the other in a particular circumstance, in order to simplify the description.

Figure 7:
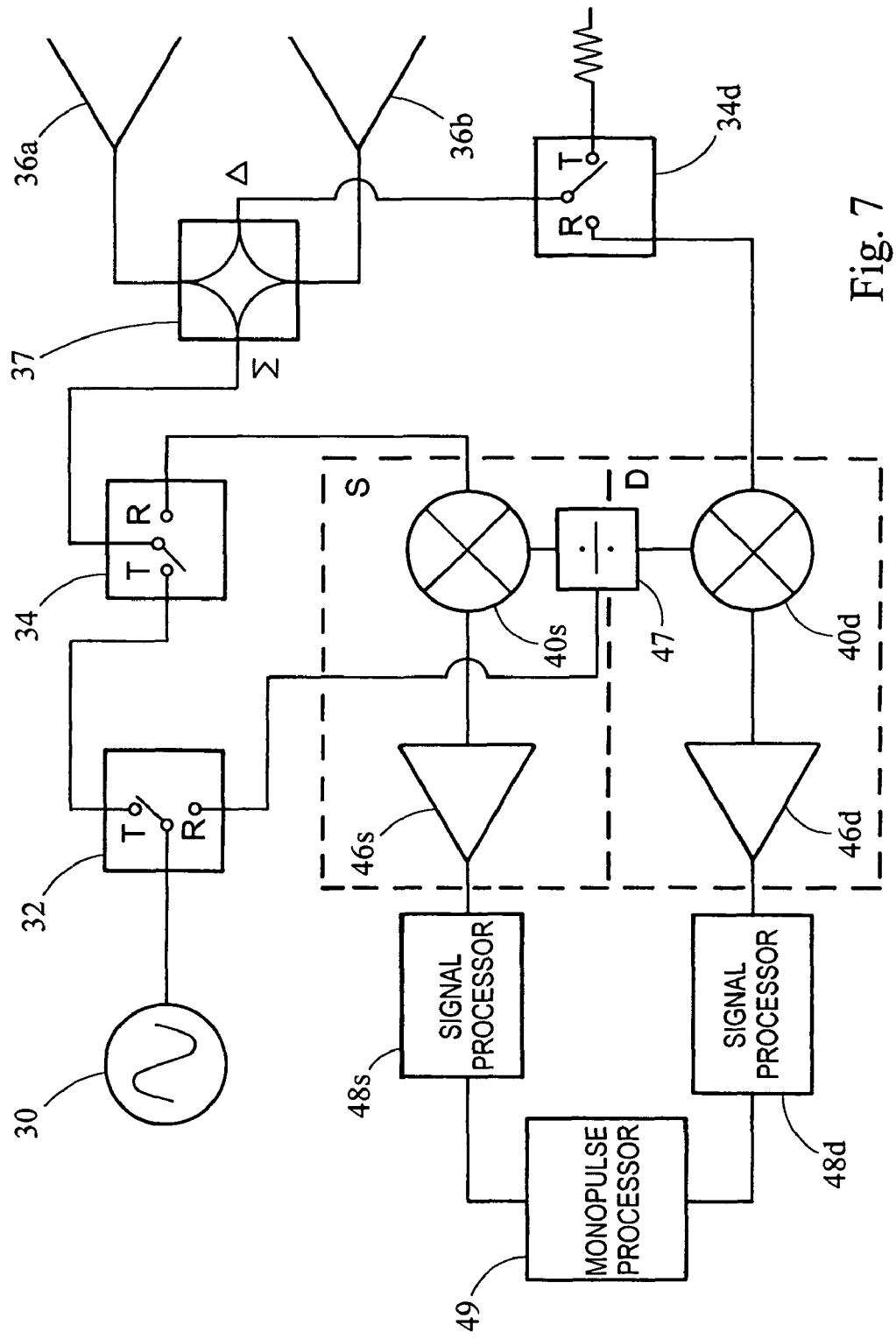
FIG. 7 shows a single aperture radar configured to operate with a monopulse antenna.

In an example, a monopulse antenna configuration may be used, as is shown in FIG. 7, where the switch positions are shown in positions which would obtain in a transmitting state "T". The monopulse antenna may include two individual radiating elements 36 a, b, each radiating element having a substantially identical radiation pattern, and spaced apart along an antenna baseline. A hybrid coupler 37 or other similar apparatus may be supply the waveform generator 30 output to the antennas 36 a, b so that the signals are radiated in phase, so as to form a sum radiation pattern. The signal received by antennas 36 a, b returns through the hybrid coupler which is configured so that a sum value of the signals received by antennas 36 a, b is present at the Σ port and a difference value of the received signals is present at the Δ port. As is known in the art, the radiation pattern for receiving of the antenna output at the Σ port has a maximum value along a plane of symmetry orthogonal to the baseline of the antennas 36 a, b, and the received radiation pattern at the Δ port has a minimum value along the same plane. The sense of the phase of the Δ port with respect to the Σ port may be used to determine the direction of the signal with respect to the boresight and the angle may be determined by the ratio of the amplitudes of the signal in the Σ and Δ ports. This type of monopulse antenna may be used in an open-loop mode, where ratio of the sum and difference antenna outputs is used to compute the azimuth of the target, or in a closed-loop or tracking mode, where the antennas are positioned in azimuth such that an error signal associated with a target located off of the axis of symmetry is minimized by orienting the antenna plane of symmetry to point at the target. In the closed-loop mode, the azimuth is then determined by the direction in which the plane of symmetry is pointed. For either the open-loop and closed-loop modes of operation, additional antennas may be employed so as to make measurements in an elevation plane as well as an azimuth plane.

The receiver configuration may have two channels, shown in FIG. 7 as the sum (s) or difference (d) channel so that the signals may be processed simultaneously. Each of the channels may have a mixer, 40 s, d, where the waveform signal from the waveform generator, 30 has been power divided by power divider 47, so that signals are applied to an input port of the mixer 40 s, d. The output of the mixer 40 s, d is applied to receiver channels 46 s, d and the output of the receiver channels applied to the signal processors 48 s, d. The output of the signal processors 48 s, d may be a signal representing the amplitude of the received signal in each channel at each difference frequency, each difference frequency represents a range to a target. The azimuth of a target may be determined by computing the ratio of the outputs of signal processors 48$s$, $d$ in a monopulse processor 49, and applying appropriate scaling factors associated with the antenna configuration. In the arrangement of FIG. 7, an additional transfer switch 34 $d$ is present and acts such that the Δ output of the hybrid coupler 37 is connected to the a mixer input of 40 $d$ in the "R" state and the Δ output of the hybrid coupler is disconnected from a mixer input of 40 $d$ in the "T" state. In the "T" state, the switch 34 $d$ may connect the Δ output of the hybrid coupler 37 to a termination resistor.

In an alternative monopulse arrangement, the Σ and Δ ports of the hybrid coupler 37 may be applied to the same mixer 40 for successive ramps, and the ratio of the signal processor 48 output for successive ramps computed for the same spectral frequency. This may be termed sequential lobing.

Figure 8:
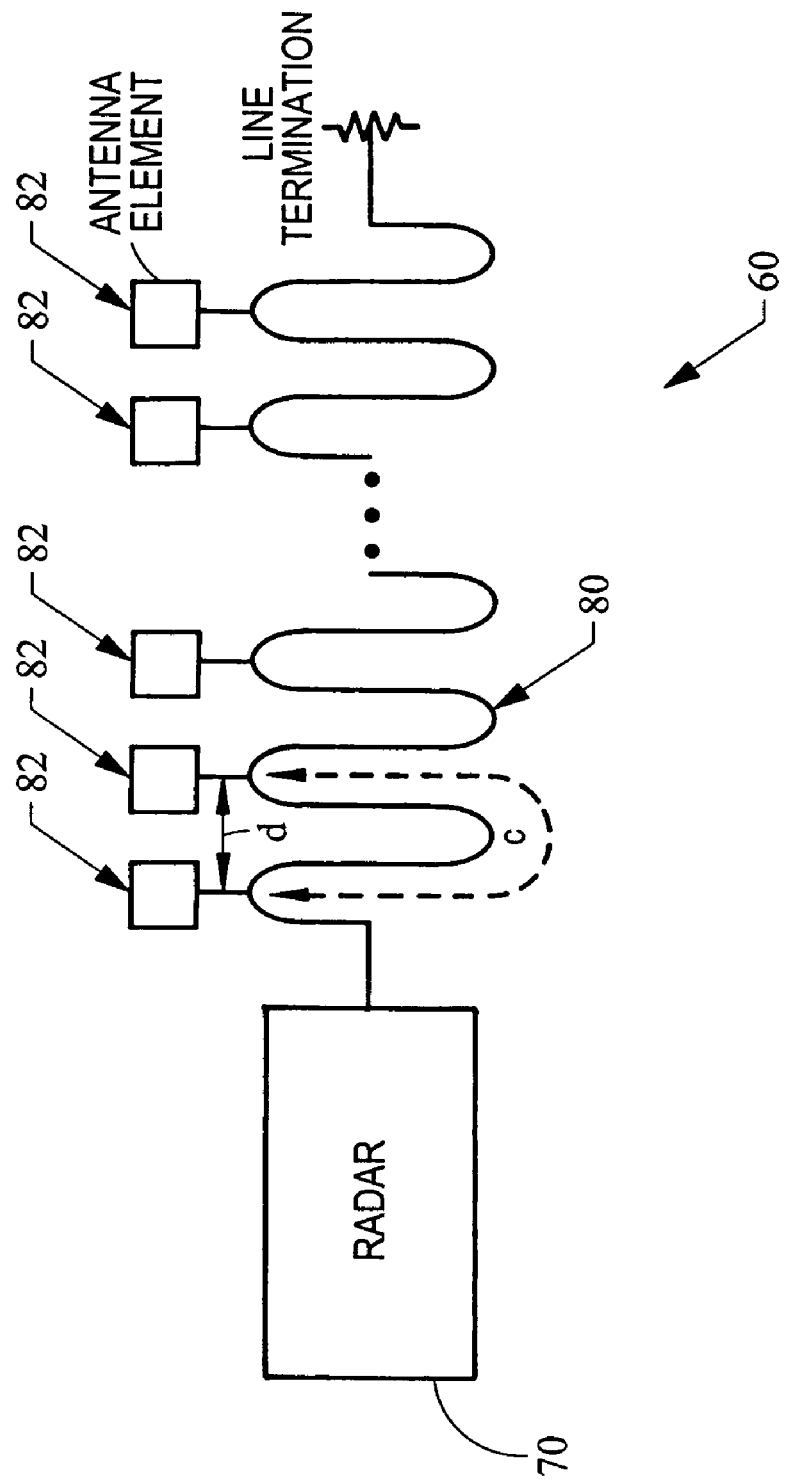
FIG. 8 is a block diagram of a single aperture radar configured to operate with a frequency scanning antenna.

The azimuth of the target may be also determined by the use of a frequency-scanned directional antenna 60, connected as the radiating element of a radar 70. In an example, a frequency-scanned antenna, as shown in FIG. 8 may be used with the FMCW waveform to perform target range and azimuth determination within one ramp period. The antenna configuration 36 of the radar 25 shown in FIG. 3 may be replaced by the configuration shown in FIG. 8. In this arrangement, a multiplicity of antennas 82 form the antenna aperture 60. The radar 25, without the antenna 36, is designated as element 70.

Typically, the antennas are spaced at equal intervals along a baseline, however unequal spacing, or antennas conforming to a surface may be used. In this example, the signal produced by the waveform generator 30 is conducted along transmission line 80 and coupled to each of the antennas in the array in series. The length, L, of the transmission line between each of the successive antennas determines the rate of change of phase shift associated with a change in transmitted frequency. The difference in phase shift between the successive antennas in an array determines the angle at which the antenna beam maximum occurs at a specific radio frequency. Thus, as is known in the art, a change in the transmitted frequency results in a change in the azimuth of the beam maximum. The amplitude of the signal applied to each of the antennas may be equal, known as "uniform weighting", or may be in accordance with known amplitude weighting functions such as Taylor, raised-cosine and the like. The object of using weighting functions that are not uniform is to control the amplitude of antenna sidelobes, which are responses of the antenna that are outside the main antenna beamwidth.

By varying the phase shift, the maximum response of the antenna aperture may be directed to different azimuths, and the amplitude of the signal transmitted by such an antenna as well as the signal received by such an antenna will be a function of the phase shift, and may related to an azimuth of the target.

Where the phase shift across the antenna aperture such that phase shift is a function of frequency, the azimuthal angle of the maximum response is a function of frequency. The FMCW waveform, as shown in FIG. 4 has a frequency which changes with time within a ramp. An array antenna of the type illustrated in FIG. 8, will therefore have a antenna azimuthal radiation pattern maximum that is a function of frequency. In this manner, the measurement of azimuth of a radar signal may be made within the time duration of a ramp, by processing the signal received during the ramp in time limited segments of the ramp and associating each time segment with transmitting frequency and the corresponding azimuth of the maximum response of the antenna radiation pattern.

Where the term "azimuth" is used, it will be understood by persons skilled in the art, that other antenna configurations may be used equivalently to determine, for example, the elevation angle of the received signal, and that these parameters may be determined either simultaneously or sequentially. Therefore the use of the term "azimuth" should be understood to encompass "elevation".

Figure 9:
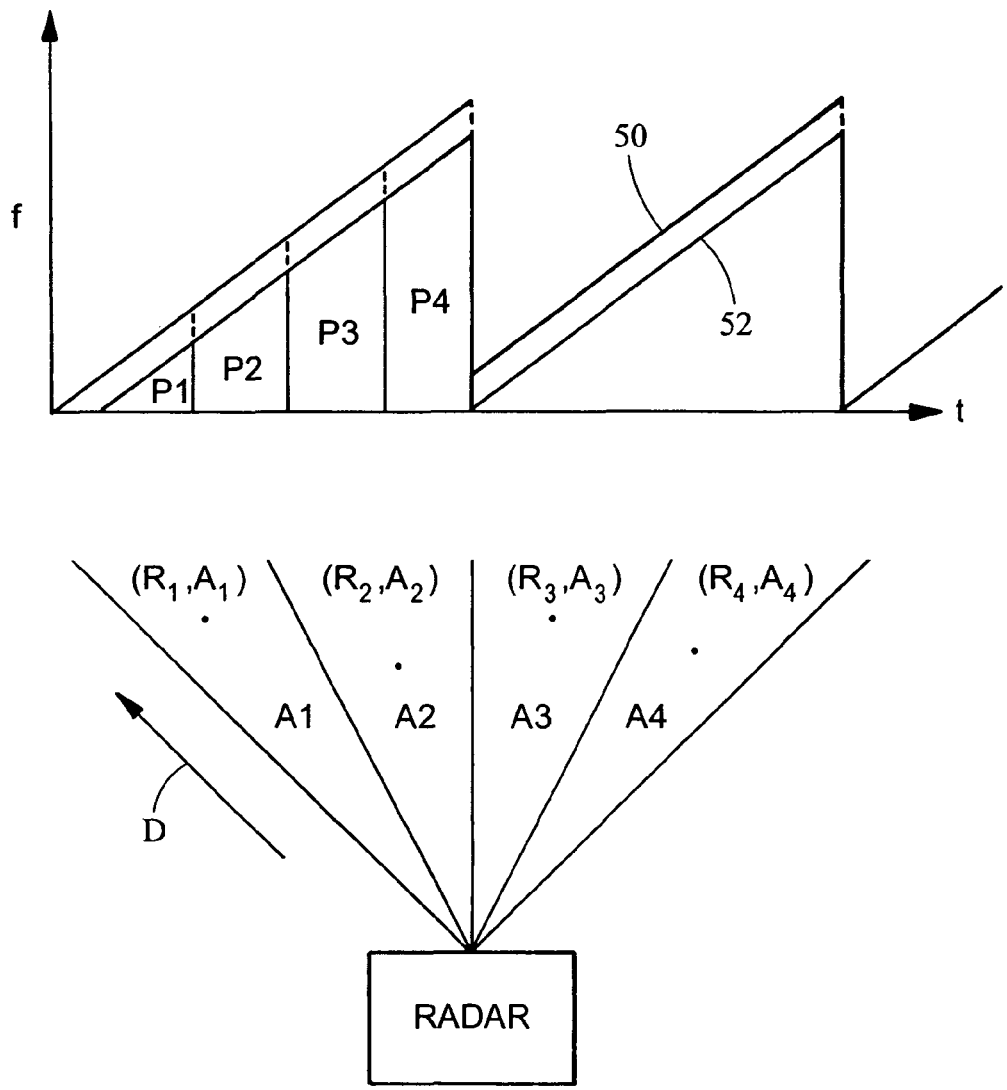
FIG. 9 shows the correspondence between antenna azimuth sectors and segments of the FMCW waveform, where a target is shown in each sector.

FIG. 9 shows an example of a FMCW ramp being divided into four time intervals P1, . . . , P4, each time interval P being associated with an azimuth A1, . . . , A4 sector, respectively, of maximum antenna radiation pattern. In each of the time intervals the signal is processed to determine the range to a target. Detected targets are associated with the azimuth A of the antenna radiation pattern maximum. That is, a group of samples S1, of the received signal, at the Nyquist rate is associated with the time period designated P1 and with targets having an azimuth within the sector A1; a group of samples S2 associated with the time period P2 and with targets having an azimuth with the sector A2, and so forth.

The group of samples S1 associated with time period P1 is processed in the signal processor 48 so as to determine the range R1 to the target, and the target is associated with the azimuth A1. There may be more than one target in the azimuthal sector A1, associated with different ranges although, for clarity, only one target is shown in each of the azimuth sectors in FIG. 9. Similarly there may be a target at a range R2, associated with time period P2, and thus associated with azimuthal sector A2.

It should be understood that the azimuthal sectors A represent an idealization of the properties of an antenna, where the response function may vary from a maximum at the center of each azimuthal range to some lower value, typically a half-power value, at the border between, for example, adjacent sectors A1 and A2. The actual response function of the azimuthal sector A1 at the mid point of azimuthal sector A2, may be significantly less than that of A2. As such, the amplitude of the signals representing a range R1 in azimuthal sectors A1 and A2 may be compared to determine the appropriate azimuthal sector, to better estimate the azimuth, or the like.

Similarly, as the direction of the maximum of the response function of a frequency-scanned antenna may vary continuously with frequency, the variation of frequency within a time period P corresponds to a variation of the azimuth of maximum antenna response during the period P. The effect of this variation is to modulate the amplitude of the signal within the period P, and such modulation may be considered a type of signal weighting.

In another example, the waveform generated by the waveform generator 30 may be a FSK signal, where the generated waveform is one of a first frequency $f_1$ and a second frequency $f_2$, and the frequency of the generated waveform alternates between the first and the second frequency. The physical configuration may be, for example, that of either FIG. 3 or FIG. 7. The received signal is sampled for a short period of time at least once during the period of time that the waveform generator is at each of the first frequency and the second frequency. The phase between the transmitted signal and the received signal at each of the first frequency and the second frequency is determined, and the difference in the phase shift between the signal received on the first frequency and on the second frequency determined.

Figure 10:
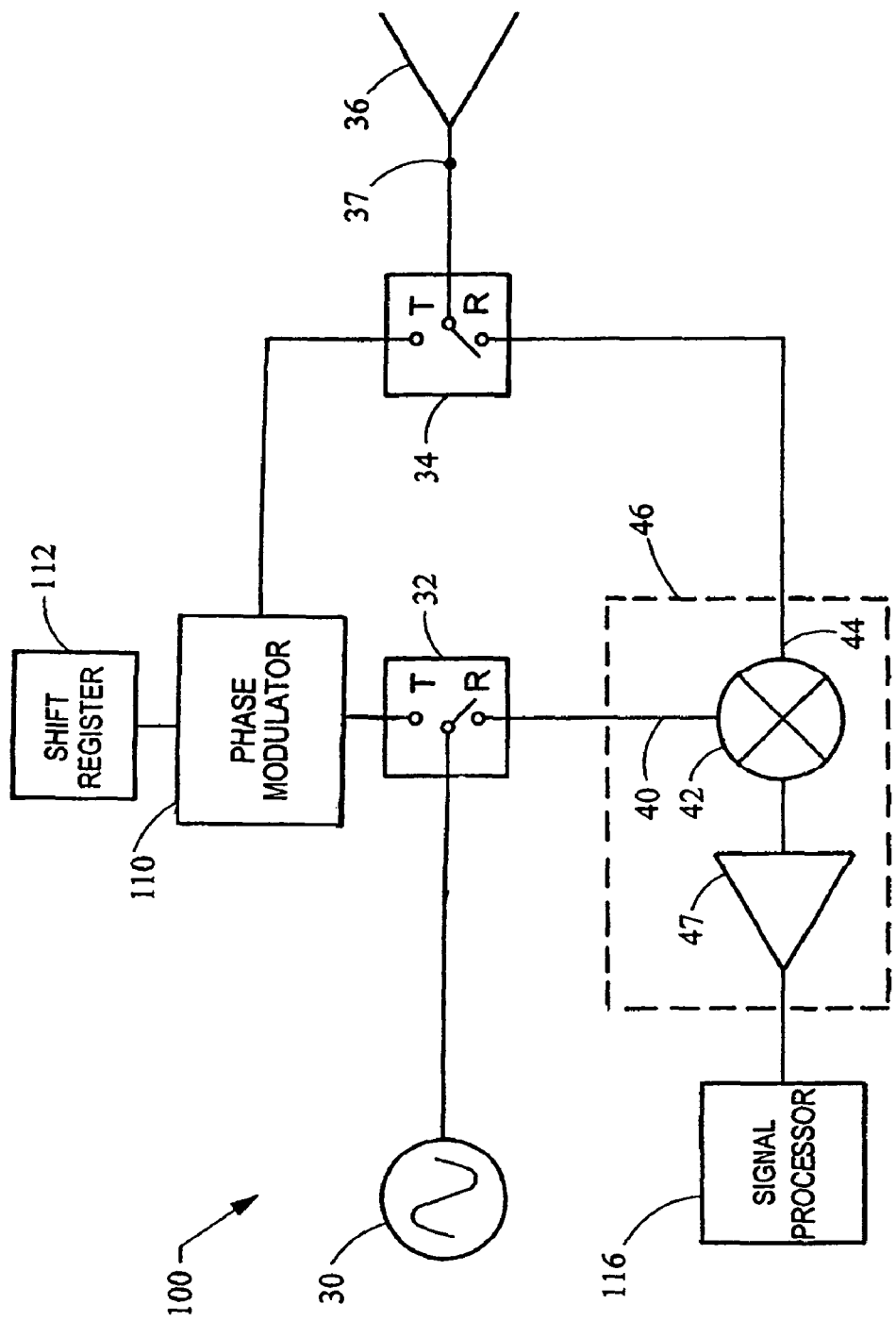
FIG. 10 is a block diagram of a single-aperture radar having a phase modulator between the waveform generator and the antenna.

In yet another example, shown in FIG. 10, a waveform generator 30 may produce a single frequency and, when the signal generator is to be connected to the antenna so as to transmit a signal through the antenna 36, a phase modulator 110 is interposed in the signal path. The phase modulator 110 may be any of the types known in the art that imposes a discrete phase shift of a signal traversing the phase modulator.

In an aspect, the phase modulator 110 may be controlled by a shift register 112. The shift register 112 may be of a feedback type, producing a pseudo-random (also known as a pseudo-noise) sequence of binary signals, the signals being designated as "0" or "1". In response to the application of the binary signals to an input of the phase modulator 110, the phase shift of the generated waveform may vary discretely from 0° to 180° with respect to the input waveform as a reference. This phase-shift arrangement is an example of a binary phase shift keying (BFSK) waveform, although other increments of phase shift may be used, as is known in the art. The sequence of binary signals constituting a pseudo-random (PN) sequence may be produced repetitively by the shift register 112, or the sequence may be stored in a random access memory associated with a computing device, and output as a result of executing a stored program. In another aspect, the PN sequence may be directly computed by executing a stored program on a computer.

A variety of PN sequences are known, having differing time and Doppler response functions, such as maximal length sequences, and the like.

If an unambiguous target response over a range interval is desired, the repetition time duration of the repetition of a PN sequence may be set to at least twice the range interval for which unambiguous response is desired. The range resolution of the waveform is, as is known, a time interval approximately equal to the duration of one of the modulation phase shift intervals. Each modulation interval, in which the waveform may take on a 0° or 180° state, is known as a "chip", and the chip duration is approximately equal to the range resolution of the waveform, expressed as a electromagnetic wave propagation time.

The transfer switches 32 and 34 operate to transition the radar from a "T" state to a "R" state at least once per chip, as shown in FIG. 10, resulting in a time series of samples. The time series of samples is applied to the input of the mixer 42 so that the signal may be converted to a frequency that may be processed by the remaining portions of receiver 46.

The waveform applied to one of the ports 40 of the mixer 42 is the un-modulated waveform generated by waveform generator 30, and the output of the mixer 42 includes sum and difference products of the unmodulated waveform and the received signal samples. The appropriate mixer output signals are filtered, amplified and otherwise conditioned by the filter and amplifier 47, and applied to a signal processor 116.

The signal processor 116 accepts a digitized output from the receiver 46, or performs the analog-to-digital conversion function. A stored replica of the transmitted PN sequence is used to perform a cross-correlation operation between the received samples and the stored PN sequence. As is known in the art, the target return, being a time delayed replica of the transmitted PN sequence has a cross-correlation coefficient with the PN sequence which may achieve a maximum value at a delay, or lag, equal to the time difference between the start of stored PN sequence and the received PN sequence. This lag is a measure of the range to the target. The effect of target motion with respect to the radar is to impose a Doppler shift on the target return signal, and a residual effect may be observed in the cross-correlation process.

Any of the known methods of performing the cross-correlation process may be employed, such as the use of shift registers, Fast Fourier Transforms (FFT), and the like, and the process may be performed in special purpose hardware, or in a computer using random access memory and a stored application program.

The use of a short sample of the received waveform at least once per chip permits the radar to operate using a single antenna, while maintaining a high average transmitted power and a low peak-to-average-power ratio.

Although the present invention has been explained by way of the examples described above, it should be understood to the ordinary skilled person in the art that the invention is not limited to the examples, but rather that various changes or modifications thereof are possible without departing from the spirit of the invention. Accordingly, the scope of the invention shall be determined only by the appended claims and their equivalents.

What is claimed is:

1. A radar, comprising:
   a waveform generator;
   a transmit-receive switch; and
   a mixer;
   wherein the waveform generator produces a frequency modulated continuous-wave (FMCW) signal; the transmit-receive switch is in a transmit state for a duration greater than or equal to 95 percent of a sum of a duration of the transmit state and a duration of a receive state; and an initial sample rate of a received signal is an inverse of a sum of the duration of the transmit state and the receive state, wherein the initial sample rate is greater than twice a differences frequency between an output of the waveform generator and a received signal from a maximum unambiguous range.

2. The radar of claim 1, wherein the FMCW signal has at least one of a positive or a negative time rate of change of frequency.

3. The radar of claim 1, wherein an output of the waveform generator is applied to an input of the mixer for at least a portion of the duration when the transmit-receive switch is in the receive state.

4. The radar of claim 1 wherein an output of the waveform generator is applied to an antenna when the transmit-receive switch is in the transmit state.

5. The radar of claim 1, further comprising a signal amplifier connected to an output of the mixer, wherein the signal amplifier has a frequency selective filter with an output response at one of the sum or difference frequency of the waveform generator and a received signal.

6. The radar of claim 1, wherein the sampled output of the mixer is processed by a signal processor to determine at least a range of a target.

7. The radar of claim 6, wherein the signal processor is adapted to perform a spectral analysis of an output of the frequency selective filter.

8. The radar of claim 1, further comprising:
   an antenna assembly.

9. The radar of claim 8, wherein one antenna assembly is used in the transmit state and in the receive state.

10. The radar of claim 8, wherein the antenna assembly is configured to have at least two antenna radiation patterns.

11. The radar of claim 10, wherein the antenna assembly has at least a sum and a difference pattern, the sum pattern connected to the waveform generator during the transmit state, and the sum and the difference pattern connected to the mixer during the receive state.

12. The radar of claim 8, wherein the antenna assembly is configured so that an azimuth of maximum response varies with transmitted frequency.

13. The radar of claim 1, wherein a difference frequency signal is formed between a waveform generator output waveform and the received signal.

14. The radar of claim 13, wherein the duration of the difference frequency signal is determined by the duration of the waveform generator output waveform at an input to a mixer.

15. The radar of claim 13, wherein the difference frequency signal is filtered and is sampled by an analog-to-digital converter.

16. The radar of claim 1, wherein the waveform generator produces a signal that is phase modulated by a pseudo-random (PN) code sequence comprised of chips.

17. The radar of claim 16, wherein a signal processor is adapted to perform a cross-correlation between the pseudo-random (PN) code sequence and an output of the mixer.

18. The radar of claim 16, wherein the output of the mixer communicates with a signal processor, the signal processor determining at least a range of a target.

19. The radar of claim 1, wherein the initial sample rate of the received signal is determined at an output of the mixer.

* * * * *